May 9, 1933. W. H. PRIESS 1,907,578

ELECTRICAL CONDENSER

Original Filed Oct. 22, 1919

Inventor,
William H. Priess,
By his Attorney
Philip Farnsworth

Patented May 9, 1933

1,907,578

UNITED STATES PATENT OFFICE

WILLIAM H. PRIESS, OF UPPER MONTCLAIR, NEW JERSEY, ASSIGNOR, BY MESNE ASSIGNMENTS, TO GENERAL ELECTRIC COMPANY, A CORPORATION OF NEW YORK

ELECTRICAL CONDENSER

Original application filed October 22, 1919, Serial No. 332,421. Divided and this application filed November 16, 1927. Serial No. 233,576.

This invention relates to improvements in electrical condensers of the plate or sheet type, especially of the type wherein the condenser is divided into sections and the sections connected in series for high potential service, although not limited to series condensers, and the invention consists of certain improvements in the means for clamping the stack.

In condensers comprising a stack of conducting and dielectric plates, it is desirable and necessary, especially when high potentials are used, that the stack be compressed and tightly clamped to exclude air and other undesirable dielectric medium between plates. The clamping device must hold the stack effectively under compression throughout the life of the condenser, notwithstanding expansion and contraction of the length of the stack from temperature changes and other causes.

According to the invention, a clamping device is provided comprising insulating side members or plates which may be of vitreous insulating material such as porcelain, or non-vitreous insulating material such as bakelite, and claw-like resilient metal end members interlocked with the side members to yieldably and elastically, but firmly hold the stack under compression. Both end members may be resilient to doubly insure the yielding and resilient action so that the plate will be held firmly compressed under all conditions of service.

This application is a division of Patent 1,695,060 dated December 11, 1928, application Serial No. 332,421, filed October 22, 1919, renewed September 26, 1925, entitled Electrical condensers.

The invention also consists in certain new and original features of construction and combinations of parts hereinafter set forth and claimed.

Figure 1:
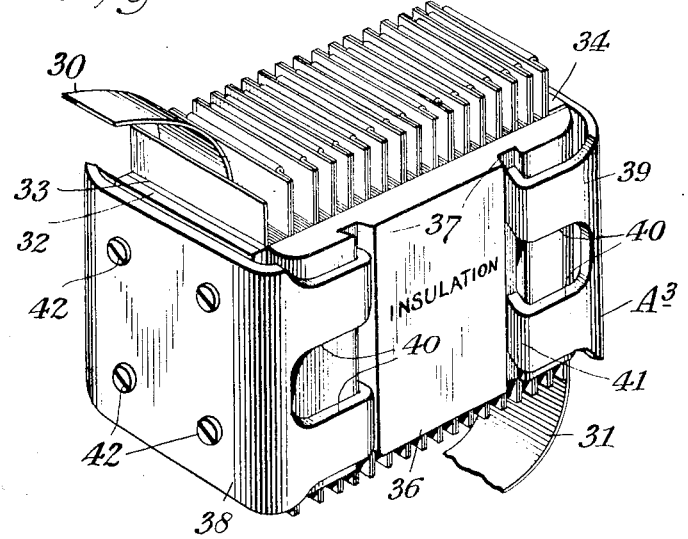
Figure 2:
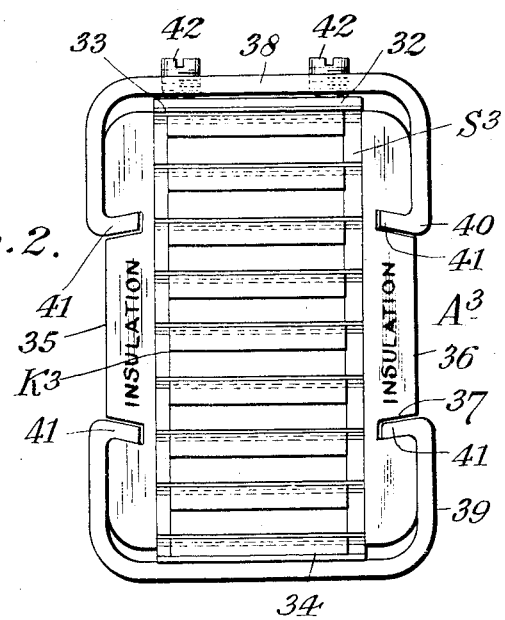

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawing forming a part thereof, in which Fig. 1 is a perspective view of a condenser having a clamp embodying the invention; and Fig. 2 is a plan view thereof.

In the following description and in the claims parts will be identified by specific names for convenience, but they are intended to be as generic in their application to similar parts as the art will permit.

Like reference characters denote like parts in the several figures of the drawing.

In the drawing accompanying and forming part of this specification, a practical commercial embodiment of the invention is shown, but as such illustration is primarily for purposes of disclosure, it will be understood that the structure may be modified in various respects without departure from the broad spirit and scope of the invention as hereinafter defined and claimed.

Referring to the drawing, the end sections S3 of stack K3 are provided with suitable leads 30 and 31 adapted to be connected to suitable terminals which may be mounted on a casing (not shown) in which the stack may be positioned or which may be arranged in any other desired manner.

Upon one end of the stack K3 is placed a metal pressure plate 32 of an area corresponding to the area of the end of the stack. Interposed between the pressure plate 32 and the adjacent end of the stack, which may be built up of mica and foil is an insulating pad 33 to prevent injury to the end of the stack. At the opposite end of the stack is an insulating sheet 34 for the same purpose.

The clamp A3 in the present instance comprises plates or blocks 35 and 36 of any rigid insu'ating material vitreous or non-vitreous, such as porcelain, bakelite, etc., and of a length substantially the length of the stack and of a width substantially the width of the stack, forming an insulating barrier and arranged upon opposite sides of the stack. The outside of each insulating block or plate is provided with a pair of transverse grooves 37 arranged adjacent the ends thereof and inclined inwardly toward their adjacent ends. These grooves 37 receive elastic or resilient claw shaped metallic clamping members 38 and 39 extending around the ends of the stack and having arms 40 extending toward one another along the sides of the stack and terminating in fingers 41 projecting into and engaging the grooves 37 in the insulating plates 35, 36.

These claw shaped clamping members 38, 39 are of spring steel and constitute a pair of resilient clamping members forming a clamp of the double spring type as distinguished from a condenser clamp in which only one of the end members is resilient. The results achieved however, are substantially the same, that is, when the clamp including insulating tension members 35, 36 is adjusted to give pressure maintaining the elements of the stack in intimate contact, the clamp maintains a constant live pressure upon the ends of the stack irrespective of variations in length in the stack due to temperature changes.

In order to adjust initially the pressure exerted by this clamp upon the ends of the stack, one of the members 38 and 39, as here shown, member 38 engaging end pressure plate 32 is provided with adjusting means for drawing up the other member tightly against its end of the stack and for pressing plate 32 tightly against its end of the stack, compressing the elements of the stack. For this purpose this means comprises a plurality of set screws 42 extending through member 38 and having their inner ends engaging the pressure plate 32 as an abutment. These screws are symmetrically arranged, left, Fig. 1, whereby the pressure upon adjustment can be distributed uniformly over the ends of the stack to insure perfect contact of the elements thereof.

It will be seen that, as the screws 42 are adjusted, the pressure plate 32 and the clamping member 39 will be moved toward each other, clamping the ends of the stack. The clamping members 38 and 39, as of spring steel, are elastic or resilient and become flexed by this adjustment maintaining a constant live pressure upon the ends of the stack whereby the elements of the stack are maintained in intimate contact as above described. Upon the adjustment of the screws 42 the pressure is transmitted to the opposite end of the stack through the insulating plates or blocks 35 and 36 as tension members and the fingers 41 are drawn up in the grooves 37 with the parts, (members 38 and 39 and plates 35 and 36), tightly connected. As the stack tends to increase in length with rise of stack-temperature, such increase will be permitted by the outward movements of the flat ends of members 38, 39 by flexing at the curved portions of said members, all without injury to insulating members 35, 36 by stresses by way of parts 41 in grooves 37; the stack compression being maintained without excessive increase on the stack lengths. Also sufficient stack compression is maintained when the stack returns to normal length at the normal temperature at which adjustment at 42 is made, since resilient members 38, 39 reverse their direction of flexure, keeping their flat end portions in surface contact operation against the ends of the stack, without any relaxation of the pulling engagements of members 38, 39 on members 35, 36. The above resilient construction of members 38, 39 also provides for convenient assembly by first inserting the stack between members 35, 36, spreading apart the sides of members 38, 39 successively, and letting them spring inward into the grooves 37; and finally adjusting the stack-pressure by screws 42. Such adjustment, in compressing the stack not only puts members 35, 36 under tension but flexes resilient members 38, 39 in the same manner as described above as resulting from a lengthening of the stack upon rise of stack-temperature. Furthermore, the freedom of movement of the flat end portion of metal end member 38 while its portion 41—41 is in anchoring relation to the insulating tension means 35–36, acts to cause a widening of the space between clamping plate 32 and said flat part 38 when threaded adjusting means 42 in line with the length of the stack is screwed down thru part 38 to force plate 32 into clamping relation with the stack against the flat portion of bottom end plate 39; that is, as the stack is put under the desired heavy compression by the alined threaded adjusting means 42, the flat top metal end member 38 is pushed further away from clamping plate 32 thereby causing pulling in opposite directions endwise of the stack, of the insulating tensioning means, the anchoring element 41—41 being operatively connected to the flat metal member 38, thereby transmitting the outward push by 42 on member 38 to outward pulls on the ends of insulation 35–36 by means of the plural anchorages 41 to the latter. Metal part 41—41 of the top end construction in Fig. 1 is the means by which the metal end construction is secured to its end of insulating tension means 35–36; metal part 38, which is movable toward and away from clamping plate 32 on the top end of the stack, is the means by which threaded adjusting means 42 functions to put the stack under compression; and the spring metal connection shown between parts 38 and 41—41 is an example of a relation between said parts which provides for the movement of part 38 toward and away from the stack-end without disturbing the securing or anchoring relation between parts 41—41 and 35–36, so that the securing relation is maintained constant but always in readiness to cause the outward pulls on the ends of 35–36 by the outward push on part 38 by adjusting means 42. In this exemplification the integral character of parts 41 and 38 is accompanied by the described spring-metal construction at the top in Fig. 1, but the important feature of this is the mobility of horizontal part 38 without accompanying movement of connected anchoring means 41—41. All this applies particularly to the top construction in Fig. 2 because it is there that the clamping adjustments are made by way of means 42 so that at the bottom there is no need of the spring-metal construction or of any other provision for movement of the horizontal metal part at the lower end of the stack, independently of the anchoring means 41—41, provided that desired adjustment freedom is provided by the movement of top member 38 away from the top stack end, while the upper anchorage 41—41 remains in securing relation to insulating tension means 35-36. The advantages of this combination are various but among them is the important advantage, (in consideration of the fact that the insulating structure 35-36 at best is not so strong as if it could be of metal, and yet must withstand extremely high tension stress), that the provision of the clamping adjustment 42, 32, 38 acting in line with the length of the stack, obviates need of weakening the insulating structure by forming threads on it as a portion of compression-adjusting means, or in other words the structure provides an adjusting system which is independent of anchorages or means for holding in fixed relation with the insulating tension means, a metal element which has an operating connection with the adjusting means which enables the latter to transmit compression stresses to the insulating tension means without disturbing said fixed relation between the latter and the anchored metal element which has an operating connection with the adjusting means. The result is a good fixed strong mechanical connection between the insulating tensioning means and the metal element anchored thereto, in the same combination with a properly movable threaded adjusting means, and wherein the threaded adjusting means is operatively independent of the fixed anchorage save for a suitable relation between a movable intermediate element of the adjusting means (as horizontal element 38 extending over the stack end) by virtue of which relation, as above, the compression stresses imparted by the stack-alined threaded means to the movable element 38 are transmitted to the fixed anchorage and to the insulating tension means, said anchorage being otherwise quite independent of the threaded means so that the anchorage itself does not involve any threaded construction.

In brief a clamp has been developed, as illustrated and described, for keeping the series sectional, high potential condenser stack at all times under a constant pressure and comprising means for insulating the ends of the stack from each other, which are at high potential differences, said insulating portion of the clamping means constituting a tension element, and consisting of vitreous or other insulating material, not only well adapted for high potential insulation, but also having adequate structural strength to withstand the high tension stresses involved in the use of the clamp.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In a condenser, a condenser stack of conducting and dielectric plates, blocks of rigid material on opposite sides of said stack and parallel to the stack axis which is normal to the plates, each block having a transverse outside groove near each end, and a resilient, claw-like clamping member at each end having arms extending towards the opposite end along the stack and terminating in fingers projecting in said grooves.

2. In a condenser, a condenser stack of conducting and dielectric plates, insulating pads on the ends of said stack, a pressure plate on one end, blocks of rigid insulating material on opposite sides of said stack of a width substantially equal to that of the stack, each block having a transverse outside groove near each end, the depth of said groove inclining inwardly towards the adjacent end of the block, a resilient, claw-like metallic clamping member at each end of the stack having arms extending towards the opposite end along the stack and terminating in fingers projecting in said grooves, and symmetrically disposed set screws in one of said clamping members engaging said pressure plate.

3. In a condenser, a condenser stack of conducting and dielectric plates, insulating pads on the ends of said stack, a pressure plate on one end, blocks of rigid insulating material on opposite sides of said stack, each block having a transverse outside groove near each end, a resilient, claw-like metallic clamping member at each end having arms extending towards the opposite end along the stack and terminating in said grooves, and symmetrically disposed set screws in one of said clamping members engaging said pressure plate.

4. A condenser comprising a condenser stack, side members on opposite sides of said stack, a claw-like end member, a pressure plate between said end member and stack, means for aiding in holding said stack under compression including said side members and end member, and devices operating between said plate and said end member for placing clamping stress on said stack.

5. A condenser comprising a condenser stack, clamping means for said stack including an end member and associated side members of structural insulating material, a clamping plate between said end member and stack, and devices operating between said end member and plate for placing said stack under compression.

6. A condenser comprising a condenser stack of armatures and dielectrics, side members on opposite sides of said stack, a clawlike, resilient end member over the end of said stack and parallel to said armatures and dielectrics and having interlocking engagement with said side members, and means including said end and side members for holding said stack under compression.

7. A condenser comprising a stack of armatures and dielectrics, insulating material extending longitudinally of the stack, means for transmitting stack pressure to said insulating material and putting said insulating material under tension, said means including at least one metal member extending across an end portion of said insulating material and interlocking with the outer surface thereof.

8. A condenser comprising a stack of armatures and dielectrics, insulating material extending longitudinally of the stack, means for transmitting stack pressure to said insulating material and putting said insulating material under tension, said means including at least one metal member engaging an inclined surface of said insulating material and providing a wedging engagement therewith for more tightly holding said end member and insulating material in cooperation with increase in stack pressure.

9. A condenser comprising a stack of armatures and dielectrics, insulating material extending longitudinally of the stack, means for transmitting stack pressure to said insulating material and putting said insulating material under tension, said means including at least one metal member extending across an end portion of said insulating material, and a pad within said stress transmitting means to protect its contiguous elements from injury, and threaded means in alignment with the stack for adjusting compression on said stack.

10. A condenser comprising a stack of armatures and dielectrics, insulating material extending longitudinally of the stack, means for transmitting stack pressure to said insulating material and putting said insulating material under tension, said means including a device bridging said insulating material and screw mechanism symmetrically arranged in alignment with said stack for adjusting the stack pressure, said insulating material including portions arranged symmetrically relative to the stack and constructed to withstand the tension of stack compression.

11. A condenser comprising a stack of armatures and a dielectric under pressure, insulating material extending substantially normally to the armatures and dielectric constituting a barrier between the ends of the stack, a metal member having a flat surface extending over one end of the stack and extending over a portion of said insulating material and cooperating with the outer surface of said insulating material in subjecting said material to tension when the metal member is compressed against the end of the stack.

12. A condenser comprising armatures and a dielectric, insulating material on opposite sides of said armatures and dielectric, a metal end member secured over each end portion of said insulating material and provided with a portion adjacent the outer surfaces of said insulating material and extending toward the opposite metal end member, said insulating material mechanically transmitting stresses which are substantially in the direction of the principal surfaces of said insulating material between said metal end members.

13. A condenser comprising a stack of armatures and dielectrics retained under pressure, insulating material constituting a barrier between the ends of said stack and being substantially free of flexural stress, a metal member having a flat surface extending over one end of said stack and extending over an end of said insulating material and extending inwardly thereof to at least partially cover the outer end walls of said insulating material, said metal end member being curved inwardly of the length of insulating material and outwardly of the stack over an end portion of said insulating material, a support adjacent the opposite end of said insulating material from said metal end member, and said insulating material transmitting stresses between said metal end member and said support.

14. A condenser comprising armatures and a dielectric, structural insulating material on at least two sides of said condenser, a metal end member secured over each end portion of said insulating material and provided with a portion extending in the direction of and adjacent the outer surface of said insulating material and secured to such outer surface for the mechanical transmission of stresses between said metal end members by said structural insulating material.

15. A condenser comprising a stack of armatures and dielectrics, insulating material on opposite sides of the stack extending longitudinally thereof, means for transmitting stack pressure to said inulating material, said means including an end member bridging an end portion of said insulating material. and threaded means aligned with said stack for transmitting stack pressure to said end member and insulating material and adapted for the adjustment of pressure on said stack.

16. A condenser comprising a stack of armatures and dielectrics, insulating material extending longitudinally of the stack, means for transmitting stack pressure to said insulating material and putting said insulating material under tension, said means including at least one metal member, said insulating material extending substantially parallel to the stack longitudinally of the stack axis and being at least substantially as long as and at least about as wide as the active portion of said stack.

17. A condenser comprising a stack of armatures and dielectrics, insulating material on opposite sides of the stack extending longitudinally thereof, means for transmitting stack pressure to said insulating material, said means including an end member bridging an end portion of said insulating material, and threaded means aligned with said stack for transmitting stack pressure to said end member and insulating material and adapted for the adjustment of pressure on said stack, and a positive mechanical interlock for the transmission of pressure from said end member to said insulating material.

18. A condenser comprising armatures with a dielectric therebetween, insulating material on at least two opposite sides of the condenser, a metal end member having a flat surface extending over an end of the condenser and secured to said insulating material, said insulating material by said relation to said metal end member normally transmitting stresses the principal portion of which are in line with the length of said insulating material.

19. A high potential condenser including a plurality of serially connected sections arranged together face to face in a stack of which the opposite ends are operatively at high potential difference; a stack-compression system including two independent metal end members respectively located at such opposite potential ends of the stack, said compression system including also clamp-tensioning means including structural insulating material extending longitudinally along the sides of the stack and transversely extending over at least two sides of the stack and having connection with said metal end members respectively at the opposite potential ends of the stack mechanically joining them in the clamping system but insulating them from one another electrically; said transverse extent of said insulating tensioning means and its said mechanical connection to said metal end members providing an insulating structure between the metal end members capable of withstanding the high tensile stresses from the stack compression by said end members; one of said metal end members being internally screw-threaded; a clamping plate between said threaded end member and the adjacent end of the stack but spaced from said end member; and metallic threaded means extending thru the threaded end member, bridging the space between it and said clamping plate and bearing on said stack-clamping plate for adjustment of stack-compression, said threaded adjusting means being independent of the insulating tensioning means and thereby preventing mechanical weakening of the insulating structure of the latter and its connection with the end members.

20. A high potential condenser including a plurality of serially connected sections arranged together face to face in a stack of which the opposite ends are operatively at high potential difference; and a stack-compressing system including two independent metal end members respectively at the opposite potential ends of the stack, said compressing system including also clamp-tensioning means of structural insulating material extending longitudinally of the stack along the sides thereof and having substantial transverse extent along said sides and connections with said metal end members at the opposite potential ends of the stack mechanically joining them together in the compressing system but insulating them electrically from one another, one of said metal end members being internally screw-threaded in alinement with the length of the stack; and said stack-compressing system including also a clamping plate adjacent but spaced from said threaded end member and bearing against the adjacent end of the stack; and externally threaded adjusting means extending thru the internally threaded portion of said metal end member in alinement with the length of the stack bridging the space between said end member and said clamping plate and bearing against the latter for stack compression.

21. A high potential condenser including a plurality of serially connected sections arranged together face to face in a stack of which the opposite ends are operatively at high potential difference; and a stack-clamping system including a clamping plate in compressing relation with one end of the stack, a metal end member located near the same end of the stack but operatively spaced from said clamping plate; said compressing system also including a second metal end member in compressing relation with the other and opposite potential end of the stack, and clamp-tensioning means of structural insulating material extending longitudinally of the stack between said metal end members, and threaded compression-adjusting means operatively in line with the length of the stack and bridging the space between said clamping plate and the adjacent metal end member and in compressing relation with the clamping plate and engaging in said adjacent metal end member: said two metal end members and insulating clamp-tensioning means being combined in a mechanical arrangement causing tensioning of said insulating clamp-tensioning means when the space between the clamping plate and neighboring metal end member is reduced by the adjustment of the threaded compression-adjusting means to stack-compressing position of the clamping plate.

22. A high potential condenser including a plurality of serially connected sections arranged together face to face in a stack of which the opposite ends are operatively at high potential difference; and a stack-compressing system including a metallic end member facing one of said opposite potential stack-ends, and exteriorly threaded adjusting means in line with the length of the stack and adjacent to and directed toward said stack-end, said metal end member being internally threaded and receiving said adjusting means and having freedom of movement toward and away from the adjacent stack-end by means of said adjusting means; tensioning means of structural insulating material extending longitudinally of and along the sides of the stack; said metallic end structure at one end of the stack including metallic means fixedly anchored to said insulating tensioning means in the vicinity of said end member and adjusting means, said internally threaded metallic end member being located intermediate said threaded adjusting means and said anchored metallic means; and a metallic structure at the other end of the stack and including means located in a position receiving compressing stress from the adjacent end of the stack and means fixedly anchored to the insulating tension means in the vicinity of said stack-end and in turn receiving stack-compressing stress from said first stress-receiving means; said intermediate internally threaded end member and neighboring anchored metallic means having a cooperative relation causing tensioning of the insulating tensioning means by way of said anchored metallic means upon movement of the intermediate internally threaded end member away from the adjacent stack-end by way of the exteriorly threaded adjusting means.

23. A high potential condenser including a plurality of serially connected sections arranged together face to face in a stack of which the ends are operatively at high potential difference; and a stack-compressing system including two metallic structures respectively at the ends of such stack, each of said structures including metallic means respectively facing the ends of the stack receiving end thrusts from the stack when compressed; tensioning means of structural insulating material extending longitudinally of and along the sides of the stack, between said two metallic end structures insulating them from one another; each of said end structures including metallic means anchored to said insulating tensioning means, the latter receiving and withstanding tensile stresses from the stack-compression by way of said end structures; one of said metallic end structures including externally threaded metallic adjusting means alined with the stack and directed toward the adjacent stack-end, and the stress-receiving means of the adjacent metallic end structure being internally threaded for the reception of said adjusting means and lying intermediate said adjusting means and the anchored metallic means of the same end structure and transmitting to said anchored means and the insulating tensioning means, the stresses of stack-compression established by said adjusting means.

In testimony whereof I hereunto affix my signature.

WILLIAM H. PRIESS.